M. C. SHARPNACK AND C. A. CRISMAN.
DRIVING GEAR FOR AUTOMOBILES.
APPLICATION FILED JAN. 7, 1919.
1,349,695. Patented Aug. 17, 1920.
2 SHEETS—SHEET 1.
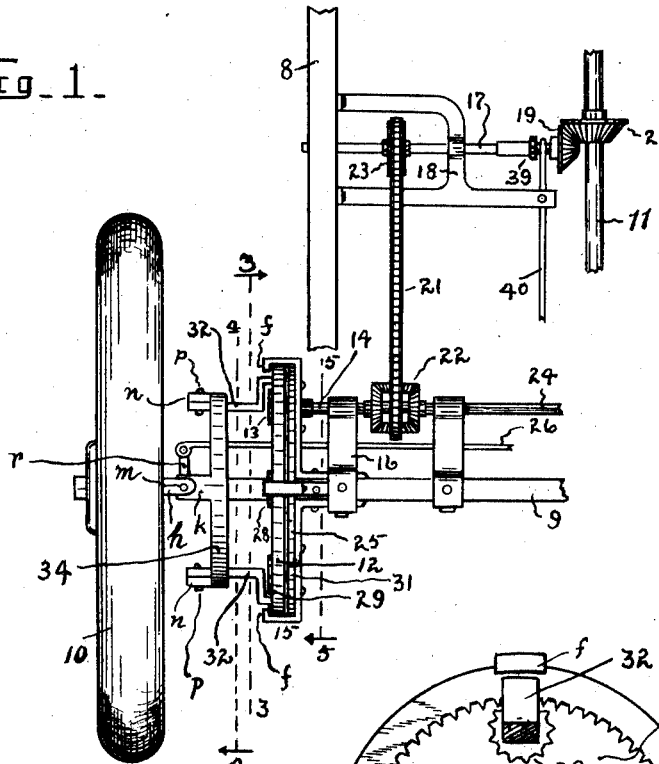
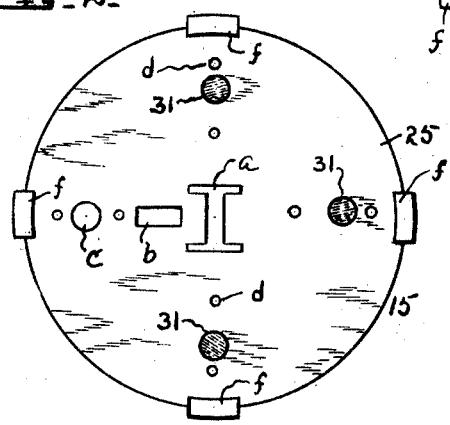
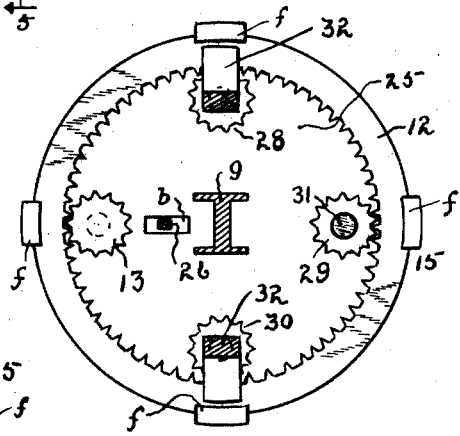
Inventors
Matthew C. Sharpnack,
and Charles A Crisman,
By Hiram A. Sturges,
Attorney M. C. SHARPNACK AND C. A. CRISMAN.
DRIVING GEAR FOR AUTOMOBILES.
APPLICATION FILED JAN. 7, 1919.
1,349,695. Patented Aug. 17, 1920.
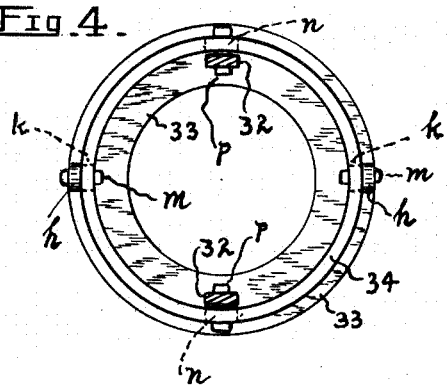
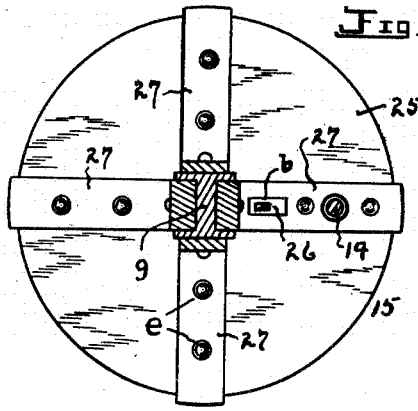
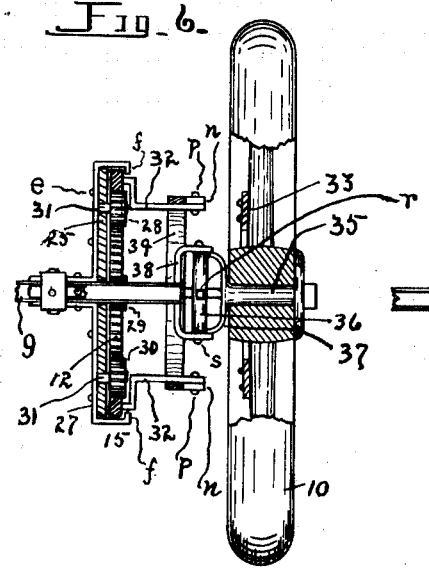
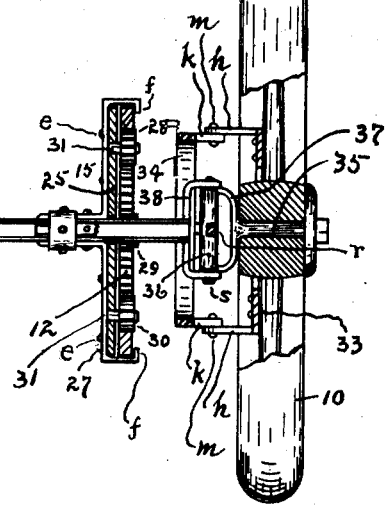
Inventors
Matthew C. Sharpnack
and Charles A. Crisman,
By Hiram A. Sturges,
Attorney

UNITED STATES PATENT OFFICE.

MATTHEW C. SHARPNACK AND CHARLES A. CRISMAN, OF OMAHA, NEBRASKA, ASSIGNORS OF ONE-THIRD TO ARTHUR E. AGEE, OF OMAHA, NEBRASKA.

DRIVING-GEAR FOR AUTOMOBILES.

1,349,695.  Specification of Letters Patent.  Patented Aug. 17, 1920.

Application filed January 7, 1919. Serial No. 269,997.

*To all whom it may concern:*

Be it known that we, MATTHEW C. SHARPNACK and CHARLES A. CRISMAN, citizens of the United States, residing at Omaha, in the county of Douglas and State of Nebraska, have invented certain new and useful Improvements in Driving-Gears for Automobiles, of which the following is a specification.

This invention relates to driving gears for automobiles, and has reference to mechanism for driving the front wheels on occasions of emergency, as when moving heavy loads, ascending inclines or driving over smooth surfaces, where it is desired to apply the power of an engine to cause a rotation of all of the wheels.

The invention includes a driving mechanism so arranged that it may be applied to automobiles generally in use and after they have left the factory, said mechanism to consist of few and simple parts so that manufacture will be convenient and economical, will be durable, and will be under ready control of a driver, for emergency uses.

With the foregoing objects in view the invention presents a novel construction, combination and arrangement of parts, as described herein and claimed, and as illustrated in the accompanying drawing, wherein,—

Figure 1 is a broken away, plan view showing the mechanism applied to one of the front wheels of an automobile. Fig. 2 is a view of one of the sides of a gear-case or frame. Fig. 3 is a side view of the gear-case and gears, being a section on line 3—3 of Fig. 1. Fig. 4 is an end view of a coupling-ring, an annular wheel-plate being added, the arms of the driven gear being in section on line 4—4 of Fig. 1. Fig. 5 is a side view of the gear-case, being a section on line 5—5 of Fig. 1. Fig. 6 is a transverse section through the gear-case, coupling-ring and wheel-plate, an automobile wheel, broken away, being also shown. Fig. 7 is a view similar to Fig. 6, showing the position of parts when the coupling-ring has been rotated 90 degrees from the position shown in Fig. 6.

Referring now to the drawing for a more particular description, the invention is illustrated in connection with a part of a chassis 8, a front, non-revoluble axle 9, and one of the front wheels 10 of an automobile. For purposes of causing a rotation of the front wheels of an automobile by utilizing the power derived from an engine shaft 11, we provide mechanism consisting, in part, of a ring-gear 12 adapted to be rotated by a pinion 13, said pinion being mounted on a transverse operating shaft 14 having bearings in a gear-case 15 and a bracket 16, the latter being mounted upon and projecting rearwardly of the axle 9.

Any suitable means may be provided for causing a rotation of the shaft 14, the means herein shown being a shaft 17 having bearings in an auxiliary frame 18, the shaft 17 having a miter-gear 19 engaging a miter-gear 20 which is mounted on the rotatable shaft 11, a sprocket chain 21 being in engagement with a differential gear 22, and a wheel 23 being provided and mounted on said shaft 17. Numeral 24 indicates a shaft disposed in line with the shaft 14 and is revoluble by the differential gear, and it will be understood that the shaft 24 is for the purpose of discharging the same functions as the shaft 14. Since the mechanism is the same in all respects for driving both of the front wheels of an automobile, the invention is illustrated only in connection with a single front wheel.

The stationary case or frame 15 which is provided for the mounting of the interiorly toothed gear wheel 12 consists, in part, of a disk 25 having an aperture *a* (Fig. 2) for receiving the axle, an aperture *b* adapted to be traversed by the reach-rod 26, an aperture *c* to be traversed by the shaft 14, and provided with a plurality of apertures *d* for the use of rivets *e*, the latter being for the purpose of rigidly connecting certain detent-strips 27 with the disk. The strips 27 are of angular form, and they are provided at their outer ends with projections *f* which extend inwardly to overlie the outer side of the gear-wheel 12, their inner ends being secured to the axle 9. The case or frame thus provided for the gear 12 may have, comparatively, a limited weight, but since it surrounds the axle and is disposed substantially at right-angles thereto, and is sustained by the strips 27 which are disposed 90 degrees apart, any vibration occasioned by the rotation of the gear 12 will not be appreciable, said gear 12 moving practically without undulations since it is in engagement with idler-pinions 28, 29 and 30, these pinions being journaled upon wrist-pins or stub-shafts 31 which are provided for the disk 25.

Numerals 32 indicate a pair of arms which are provided for the gear 12, these being disposed 180 degrees apart and projecting outwardly toward the adjacent automobile wheel. At 33 is indicated an annular plate which is secured to the wheel, said plate being provided with a pair of arms or lugs *h* also disposed 180 degrees apart. Numeral 34 indicates a coupling-ring having projections *k* disposed 180 degrees apart, these being pivotally connected with the arms *h* of the wheel-plate 33, as indicated at *m*. The coupling-ring is also provided with projections *n*, these being disposed 90 degrees from the projections *k*, and they are pivotally connected with the pair of arms 32 of the gear 12, as indicated at *p*.

Numeral 35 indicates the stub-axle for the mounting of the automobile wheel, and a conventional coupling is employed whereby, by use of the reach-rod 26, under control of an operator, a horizontal swinging movement of the front wheel may be effected, the reach-rod being connected, as usual, with the arm *r* of the pintle 36 of the yoke 37 which is provided for the stub-axle, said pintle having the usual pivotal connection *s* with the yoke 38 of the front axle.

As thus described, the coupling-ring 34 provides a connection whereby the movement of the driven gear 12 is communicated to the automobile wheel, and it will be appreciated that since the arms *h* of the wheel-plate 33 are disposed comparatively remote from the stub-axle 35, the power will be applied to the automobile wheel to great advantage, the ring-coupling remaining in a vertical position when the automobile is moving on a direct course, but adapted to have a swinging movement horizontally when moving upon curves, since the projections *n* and *k* of said coupling-ring are disposed 90 degrees apart for their respective mountings upon the arms 32 and arms *p*.

A clutch 39 is shown in Fig. 1, and by use of a lever 40 an operator may have a control for causing the revoluble movement of the shaft 11 to be communicated to the shaft 17 for actuation of the gear 12, this being of advantage when a heavy load is to be drawn or when ascending inclines, as first mentioned.

While we have described construction in detail, we do not wish to be understood as limiting ourselves in this respect, and changes in form, size, proportion and minor details may be made within the scope of the invention as claimed.

What we claim and desire to secure by Letters Patent is,—

1. In driving mechanism for vehicle wheels, a vehicle axle, a gear case stationary with and traversed at its axis by the axle, a plurality of pinions equi-distant from the axle having journaled bearings on the gear case, a revoluble ring gear engaging the pinions of the gear case, a vehicle wheel journaled on the axle, and a coupling ring between and having pivotal connections with the vehicle wheel and said ring gear.

2. In driving mechanism for vehicle wheels, a vehicle axle, a vehicle wheel journaled on the axle, a disk traversed at its middle by the axle, frame-strips stationary with the disk and axle and having projections disposed outwardly of the periphery of the disk, a plurality of pinions equi-distant from the axle having journaled bearings on the disk, a revoluble ring gear inwardly of the projections of the frame-strips in engagement with the pinions, and a coupling-ring between and connected with the vehicle wheel and said ring gear.

3. In driving mechanism for vehicle wheels, a vehicle axle, a vehicle wheel journaled on the axle, a disk traversed at its middle by the axle, frame-strips stationary with the disk and axle and having angularly formed projections disposed outwardly of the periphery of the disk, a plurality of pinions equi-distant from the center of, and having journaled bearings on the disk, a ring gear disposed inwardly of the angularly formed projections of the frame-strips in engagement with the pinions of said disk, a coupling-ring between and pivotally connected with the vehicle wheel and ring gear, and a revoluble operating shaft disposed at right-angles to and traversing the disk, and having a pinion engaging the ring-gear.

In testimony whereof we have affixed our signatures in presence of two witnesses.

MATTHEW C. SHARPNACK.
CHARLES A. CRISMAN.

Witnesses:
ARTHUR H. STURGES,
HIRAM A. STURGES.